United States Patent [19]

Takagi et al.

[11] 4,402,019

[45] Aug. 30, 1983

[54] MAGNETIC RECORDING/REPRODUCING APPARATUS

[75] Inventors: Satoshi Takagi; Toshio Watanabe, both of Toda, Japan

[73] Assignee: Clarion Co., Ltd., Tokyo, Japan

[21] Appl. No.: 305,702

[22] Filed: Sep. 25, 1981

Related U.S. Application Data

[63] Continuation of Ser. No. 36,527, May 7, 1979, abandoned.

[30] Foreign Application Priority Data

May 8, 1978 [JP] Japan ............................. 53-60834[U]
May 8, 1978 [JP] Japan ............................. 53-60835[U]

[51] Int. Cl.³ ....................... G11B 15/18; G11B 19/02
[52] U.S. Cl. ...................................... 360/71; 360/74.1
[58] Field of Search ................... 360/74.1, 74.2, 71, 360/75

Primary Examiner—Alfred H. Eddleman
Attorney, Agent, or Firm—Wallenstein, Wagner, Hattis, Strampel & Aubel

[57] ABSTRACT

An auto reverse type magnetic tape recording/reproducing apparatus comprising a hold plunger for holding an operation mode as it is, a reverse plunger for changing over the tape feed direction from forward to reverse and vice versa, a detector circuit for generating a pulse at the end of the tape, first transistor means for releasing the hold plunger, second transistor means for actuating the reverse plunger to effect drawing, and selector switch means for selectively applying an output of the detector circuit to either of the first and the second transistor means according to the operation mode.

6 Claims, 2 Drawing Figures

MAGNETIC RECORDING/REPRODUCING APPARATUS

This application is a continuation of application Ser. No. 036,527, filed May 7, 1979, now abandoned.

TECHNICAL FIELD

This invention relates to a magnetic recording/reproducing apparatus, and more particularly to an improvement in an auto reverse type magnetic tape recording/reproducing apparatus.

BACKGROUND ART

Heretofore, there has been widely known a so-called auto reverse type tape recording/reproducing apparatus which is capable of automatically reversing a tape feed direction by driving a tape in a rewinding direction and automatically changing the position of a head when the tape is fully taken up in one direction.

Generally, the known auto reverse type tape recording/reproducing apparatus can attain reproduction in both the forward and reverse directions, but can make recording only in the forward direction. The tape recording/reproducing apparatus of this kind is required to have such a formation that a pause operation is suspended in a reverse, fast feed or rewind mode and that a fast feed, rewind or pause operation is free from a manual program operation but a recording operation is stopped upon the manual program operation.

SUMMARY OF INVENTION

It is therefore an object of the present invention to provide a magnetic tape recording/reproducing apparatus which is capable of automatically shutting off the tape feeding and/or reversing the tape feed direction upon detection of the end of the tape with a simplified structure.

To attain the object, the apparatus in accordance with the present invention is specifically adapted to a draw a reverse plunger and release a hold plunger by selectively providing a tape end signal to the reverse plunger and the hold plunger through switch means.

PREFERRED EMBODIMENT OF INVENTION

Figure 1:
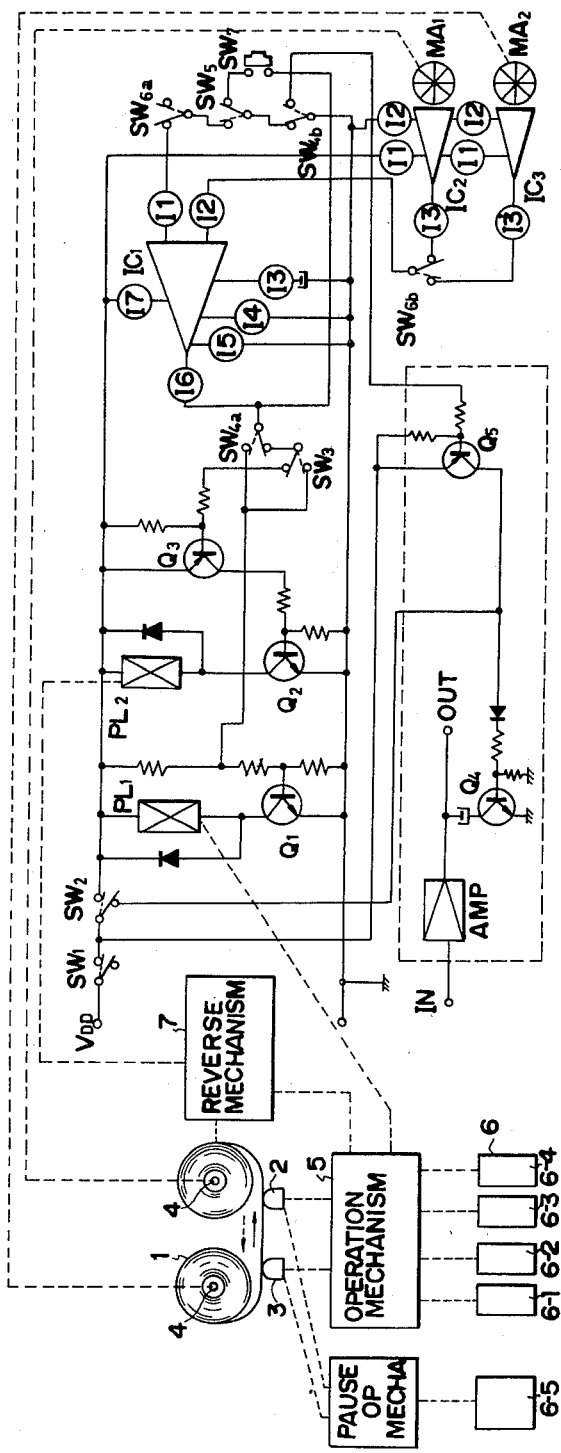
FIG. 1 is a circuit diagram of one form of a control circuit for use in a magnetic recording/reproducing apparatus in accordance with the present invention.

FIG. 1 shows one form of an auto reverse type recording/reproducing apparatus embodying the invention, illustrating a control circuit therefor. In the apparatus, various operations are carried out by push buttons or levers and the operations are locked by a plunger. The control circuit as illustrated in FIG. 1 allows a recording operation only during a forward tape feed.

In the figure, 1 is a cassette tape, 2 a recording/reproducing magnetic head, 3 an erase head, 4 a reel shaft, and 5 a known operation mechanism actuatable by a push button 6 to bring the heads 2 and 3 into contact with the tape 1 for recording, to bring only the head 2 into contact with the tape 1 for reproducing and to disengage the heads 2 and 3 from the tape 1, driving the reel shaft 4 at a high speed for rewinding. A hold plunger $PL_1$ is adapted to act on the operation mechanism 5, after the operation of recording, reproducing, fast feeding or rewinding by the mechanism 5 has been effected, for holding the operation. A reverse plunger $PL_2$ for changing over the feed direction of the tape 1 is adapted to actuate a reverse mechanism 7 to effect the aforesaid changing over operation. $SW_1$ is a pack switch adapted to be switched to a position as indicated by a broken line when a tape pack (a cassette tape) is loaded; $SW_2$ is a hold switch adapted to be switched to a position as indicated by a broken line when the recording, reproducing, fast feeding or rewinding operation is carried out; $SW_3$ is a record switch adapted to be switched to a position of a broken line for the recording operation; $SW_{4a}$ and $SW_{4b}$ are fast feed/rewind switches adapted to be switched to positions as indicated by broken lines for the fast feed/rewind operation; $SW_5$ is a pause switch adapted to be switched to a position as indicated by a broken line for a pause operation; $SW_{6a}$ and $SW_{6b}$ are forward/reverse selector switches adapted to be switched to positions as indicated by broken lines for reversing operation; and $SW_7$ is a manual program switch. $IC_1$ is a tape end detector circuit which is adapted to lower an electric potential at a terminal $I_6$ for a time of $t_2$, when a time of $t_1$ passes after a terminal $I_2$ has ceased to receive pulses, or adapted not to change the electric potential at the terminal $I_6$ where a terminal $I_1$ is grounded, even when the pulses are not inputted to the terminal $I_2$. $IC_2$ and $IC_3$ are Hall device circuits adapted to detect magnetic conditions of magnets $MA_1$ and $MA_2$ mounted on the rotary shafts 4 of reel bases (not shown), respectively, for providing pulses to terminals $I_3$ and $I_3'$, respectively, according to the rotation of the reel bases (the tape feed rate). $V_{DD}$ is a power source terminal, AMP an amplifier for amplifying a signal to be reproduced which is picked up by the head 2 for applying the signal to a speaker (not shown), IN an input terminal of the amplifier AMP, OUT an output terminal of the amplifier, and $Q_1$ to $Q_5$ are transistors.

When not in operation, the contacts of the switches $SW_1$ to $SW_6$ are in positions as shown by solid lines, respectively. Terminals $I_3$, $I_4$, $I_5$ and $I_7$ of the circuit $IC_1$ and terminals $I_1$ and $I_2$ of each of the circuits $IC_2$ and $IC_3$ are all power source terminals.

The operations of the circuit as illustrated in FIG. 1 will be now explained according to the modes of the operations.

(1) Reproducing Operation

When the tape pack is inserted or loaded in a recording/reproducing mechanism, a contact of the pack switch $SW_1$ is closed as shown by the broken line. Then, if a reproducing button 6-1 is depressed, a contact of the hold switch $SW_2$ is closed as shown by the broken line and the transistor $Q_1$ is turned on to pull the hold plunger $PL_1$ and hold the reproducing mode.

On the other hand, a pulse is applied from the terminal $I_3$ of the Hall device circuit $IC_2$ to the terminal $I_2$ of the tape end detector circuit $IC_1$ through the switch $SW_{6b}$, according to the rotation of the magnet $MA_1$ which is rotated conjointly with the reel shaft 4, and the terminal $I_6$ is held at a high potential.

Then, when the rotation of the reel shaft 4 is stopped at the end of the tape, the terminal $I_2$ of the detector circuit $IC_1$ cannot receive an input pulse any more so that the potential at the terminal $I_6$ is lowered for a time of $t_2$ after a time of $t_1$. Therefore, a base potential of the transistor $Q_3$ is lowered by way of the switches $SW_{4a}$ and $SW_3$ to render the transistor $Q_3$ conductive. Subsequently, the transistor $Q_2$ is turned on so that the reverse plunger $PL_2$ operates to pull for a time of $t_2$ for carrying out automatic reversing of the tape feed direction. After the reversing, the forward/reverse selector switches $SW_{6a}$ and $SW_{6b}$ are switched to the positions of the broken lines, respectively, and a pulse generated from the Hall device circuit $IC_3$ according to the rotation of the magnet $MA_2$ is inputted to the detector circuit $IC_1$. Accordingly, the reverse plunger $PL_2$ is pulled at the end of the tape in the same way as mentioned above to effect a reversion again.

(2) Recording Operation

When the cassette tape is inserted or loaded into the recording/reproducing mechanism, the switch $SW_1$ is closed as shown by the broken line. Under these conditions, when a recording button and reproducing button are depressed for carrying out a recording operation, the contacts of the switches $SW_2$ and $SW_3$ are thrown into positions as indicated by the broken lines, respectively. The hold plunger is then attracted to keep the recording mode.

At the end of the tape, i.e., when the tape reaches an end, the electric potential at the terminal $I_6$ of the detector circuit $IC_1$ is lowered after a time of $t_1$. Then, the base potential of the transistor $Q_1$ is lowered by way of the switches $SW_{4a}$ and $SW_3$ so that the transistor $Q_1$ ceases to conduct and the hold plunger $PL_1$ is released. Thus, the apparatus is thrown into suspended state.

(3) Fast Feed/Rewind Operation

Upon depression of a fast forward button 6-2 or a rewind button 6-3, the switches $SW_1$, $SW_2$, $SW_{4a}$ and $SW_{4b}$ are switched to positions as indicated by the broken lines, respectively. Therefore, in the same manner as mentioned above, the fast feed or rewind operation is maintained by the hold plunger $PL_1$. At the end of the tape, the transistor $Q_1$ is turned off through the switch $SW_{4a}$. As a result, the hold plunger $PL_1$ is released and the apparatus is thrown into suspended state.

(4) Pause Operation

In the reproducing or recording mode and in a forward feed mode, when a pause button 6-5 is depressed to carry out the pause operation through the pause operation mechanism 8, the heads 2 and 3 are temporarily disengaged from the tape 1 and the switch $SW_5$ is switched to the position of the broken line, letting the terminal $I_1$ of the detector circuit $IC_1$ be grounded through the switches $SW_{4b}$, $SW_5$ and $SW_{6a}$. Therefore, even if no pulses are applied to the terminal $I_2$ of the detector circuit $IC_1$, the electric potential at the terminal $I_6$ is by no means lowered and the pause operation in the reproducing or recording mode is held. The pause mode means such a state that pinch rollers (not shown) are disengaged from capstans and the reel bases are not rotated.

On the other hand, in reverse feed mode, the pause mode is not attained even if the pause button is depressed. However, since the switch $SW_{6a}$ is in the position of the broken line, the reverse plunger $PL_2$ is pulled to establish the forward feed mode at the end of the tape, irrespective of the depression of the pause button. The pause mode is then established and held thereafter.

Further, in case the pause button is operated in the fast feed or rewind mode, the pause mode is not achieved. However, since the switch $SW_{4b}$ is in the broken line position, the apparatus is put in a suspended state at the end of the tape.

(5) Manual Program Operation

When the program switch $SW_7$ is depressed in the reproducing mode, a voltage divided by resistors is applied to the base of the transistor $Q_3$ to allow the transistor $Q_3$ to conduct. Then, the transistor $Q_2$ is turned on and the reverse plunger $PL_2$ is energized to be attracted for carrying out the reversing operation.

In the recording mode, since the switch $SW_3$ is in the broken line position, the transistor $Q_1$ is in the nonconducting state. Therefore, there is no possibility that recording is effected erroneously.

In the fast feed or rewind mode, since the switch $SW_{4a}$ is in the broken line position, there will be caused no change in operation by depression of the switch $SW_7$.

Further, in the pause mode, since the switch $SW_5$ is in the position as indicated by the broken line, no reversion is caused by the depression of the switch $SW_7$.

(6) Muting Operation

The muting operation is carried out by a circuit encompassed by broken lines in FIG. 1.

More specifically, when the apparatus is in the suspended state, the transistor $Q_4$ conducts through the contact of the switch $SW_2$ indicated by a solid line, and in the fast feed or rewind mode, the transistors $Q_5$ and $Q_4$ conduct due to the position of the switch $SW_{4b}$ as indicated by the broken line. Then, the output OUT of the amplifier AMP is bypassed and the muting is accomplished.

According to the embodiment of the present invention as disclosed above, a signal detected at the end of the tape is switched by switches for the respective operation modes to pull the reverse plunger $PL_1$ and release the hold plunger $PL_2$.

Figure 2:
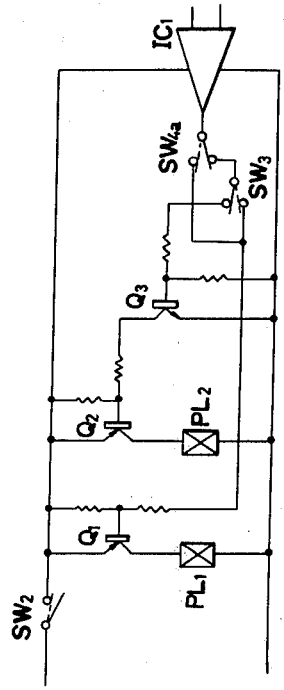
FIG. 2 is a circuit diagram of another form of a control circuit for the magnetic recording/reproducing apparatus of the present invention, illustrating a principal portion thereof.

FIG. 2 shows a modification of the principal portion of the control circuit for the tape recording/reproducing apparatus of this invention. In the modification, the output of the detector circuit $IC_1$ is changed from a low level to a high level when a time of $t_1$ has passed from the tape end.

In the circuit as illustrated, the transistors $Q_1$ to $Q_3$ and the plungers $PL_1$ and $PL_2$ correspond to the members indicated by the same letters and numerals in FIG. 1, respectively, but differ in connection from the latter.

The operation is identical with that of FIG. 1 except that the potential of the output of the detector circuit $IC_1$ is inverted.

As mentioned above, this invention enables accurate reversion of the tape feed direction and automatic shut off of the tape feed with a simple structure at the end of the tape.

In addition, as can be understood from the descriptions on the operations as given in (4) and (5) above, the pause operation is prohibited, by a simple switch structure, in the reverse feed, fast feed or rewind mode, and the fast feed, rewind or pause operation is by no means affected even if the program switch is operated during the aforesaid operations. Furthermore, if the program switch is operated during the recording operation, the tape feed is stopped to avoid undesired recording. Further, according to the present invention, muting is also attainable in the suspended mode, fast feed or rewind mode.

We claim:

1. In a recording/reproducing apparatus including: recording head means for recording a signal on a cassette tape or reproducing a recorded signal therefrom; individually manually operable operation means for respectively effecting in their operative conditions recording, reproducing, fast feed, and rewinding operations; operation mechanism responsive to the operated condition of the operation means calling for a recording or reproducing operation for moving said recording head means against the tape of the cassette and driving said tape in a forward direction, and responsive to the operated condition of the operation means calling for a fast feed or rewind operation for removing said recording head means from the tape and driving the tape at a desired speed and direction; and tape drive reversing mechanism having an initial inoperative condition and operable to an operative condition which reverses the direction in which the tape is driven; the improvement which comprises hold means responsive in an initial operative condition to the operation of any of said operation means to said operated condition which produces said recording, reproducing, fast feed or rewinding operation for holding the operation means involved in its operated condition to effect the operation called for thereby, and releasing the same therefrom when operated to a releasing condition; reverse activating means operable between an initial inoperative to an operative condition which operates said reversing mechanism to reverse the direction of feed of said tape; detecting means for detecting an end of tape condition; control means for initially operating said hold means and activating means respectively in said initial operative and inoperative conditions while the tape is being driven; and a plurality of switch means both controlling and responsive to the condition of said control means and having output conditions corresponding to the conditions of the associated manually operable operation means for effecting through said control means the operation of said holding means to said releasing condition and the maintenance of said activating means in said inoperative condition when a fast feed, rewind or recording operation is called for and said tape means detects an end of tape condition, and maintaining said holding means in said operative condition and operating said reverse activating means to said operative condition to reverse the direction of the tape feed only when a reproducing operation is called for and said detecting means detects an end of tape condition.

2. In a recording/reproducing apparatus including: recording head means for recording a signal on a cassette tape or reproducing a recorded signal therefrom; individually manually operable operation means for respectively effecting in their operative conditions recording, reproducing, fast feed, rewinding and pause operations; operation mechanism responsive to the operated condition of the operation means calling for a recording or reproducing operation for moving said recording head means against the tape of the cassette and driving said tape in a forward direction, and responsive to the operated condition of the operation means calling for a fast feed or rewind operation for removing said recording head means from the tape and driving the tape at a desired speed and direction, and responsive to the operated condition of the operation means calling for a pause operation for stopping the feeding of the tape and temporarily removing said recording head means from said tape to attain a pausing operation when a recording or reproducing operation is called for; and tape drive reversing mechanism having an initial inoperative condition and operable to an operative condition which reverses the direction in which the tape is driven; the improvement which comprises hold means responsive in an initial operative condition to the operation of any of said operation means to said operated condition which produces said recording, reproducing, fast feed or rewinding operation for holding the operation means involved in its operated condition to effect the operation called for thereby, and releasing the same therefrom when operated to a releasing condition; reverse activating means operable between an initial inoperative to an operative condition which operates said reversing mechanism to reverse the direction of feed of said tape; detecting means for detecting when the tape is no longer being driven; control means for operating said hold means and activating means initially in said operative and inoperative and releasing conditions when the tape is being driven; and a plurality of switch means both controlling and responsive to the condition of said control means and having conditions corresponding to the conditions of the associated manually operable operation means for effecting through said control means the operation of said holding means to said releasing condition and the maintenance of said activating means in said inoperative condition when a fast feed, rewind or recording operation is called for and said tape means detects an end of tape condition, maintaining said holding means in said operative condition and operating said reverse activating means to said operative condition to reverse the direction of the tape feed only when a reproducing operation is called for and said detecting means detects an end of tape condition, and preventing the operation of said hold means to said releasing condition or said activating means to said operative condition when a pause operation is called for and said detecting means detects the absence of the feeding of said tape.

3. The recording/reproducing apparatus according to claim 1 wherein said hold means includes an electrical operated plunger which, in the operative condition of the hold means, is normally energized through a normally conducting current control device rendered non-conductive by said control means when the operated operation means calls for a recording, fast feed or rewind operation and an end of tape condition is detected.

4. The recording/reproducing apparatus according to claim 6 wherein said reverse activating means includes an electrical operated plunger device which, in the operative condition of the activating means, is energized, through a normally non-conductive current control device rendered conductive by said control means when said operation means calls for a reproducing operation and an end of tape condition is detected.

5. The recording/reproducing apparatus according to claim 1 or 2 wherein said control means has a first input coupled to said detector means which produces signals whenever said tape is being fed in a forward or reverse direction, said control means when said signals disappear from said first input indicating that a tape feeding has terminated reversing the signal condition at the output thereof, some of said switch means coupling the reversed output of said control means to said hold means and other of said switch means coupling the reversed output of said control means to said reverse activating means when an end of the tape condition exists.

6. The recording/reproducing apparatus according to claim 2 wherein said control means has a first input coupled to said detector means which produces signals whenever said tape is being fed in a forward or reverse direction, said control means when said signals disappear from said first input indicating that a tape feeding has terminated reversing the signal condition at the output thereof, some of said switch means coupling the reversed output of said control means to said hold means and other of said switch means coupling the reversed output of said control means to said reverse activating means when an end of the tape condition exists and said control means having an inhibiting input which prevents the output of said control means from being reversed when no signals are fed to said first input from said detecting means, said inhibiting input being coupled to a source of inhibiting potential through switch means responsive to an operated operation means calling for a pause operation and switch means responsive to an operated operation means calling for a recording or reproducing operation.

* * * * *